(12) United States Patent
Muromachi et al.

(10) Patent No.: US 9,015,913 B2
(45) Date of Patent: Apr. 28, 2015

(54) BUCKLE DEVICE

(71) Applicant: Kabushiki Kaisha Tokai-Rika-Denki-Seisakusho, Aichi-ken (JP)

(72) Inventors: Tetsushi Muromachi, Aichi-ken (JP); Nao Sasaki, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 13/729,237

(22) Filed: Dec. 28, 2012

(65) Prior Publication Data
US 2013/0174390 A1 Jul. 11, 2013

(30) Foreign Application Priority Data
Jan. 11, 2012 (JP) .................................. 2012-003512

(51) Int. Cl.
*B60R 22/48* (2006.01)
*A44B 11/25* (2006.01)

(52) U.S. Cl.
CPC ............. *B60R 22/48* (2013.01); *A44B 11/2561* (2013.01); *A44B 11/2523* (2013.01); *A44B 11/2546* (2013.01)

(58) Field of Classification Search
USPC ............................ 24/633, 636, 637, 641, 642
See application file for complete search history.

(56) References Cited

U.S. PATENT DOCUMENTS

| | | | | |
|---|---|---|---|---|
| 4,163,128 | A * | 7/1979 | Miskowicz | 200/61.58 B |
| 4,920,620 | A * | 5/1990 | Yamamoto et al. | 24/641 |
| 6,205,627 | B1 * | 3/2001 | Hoika | 24/633 |
| 6,477,753 | B1 * | 11/2002 | Burke | 24/637 |
| 6,571,435 | B2 * | 6/2003 | Jain et al. | 24/651 |
| 2002/0166216 | A1 * | 11/2002 | Jain et al. | 24/633 |
| 2008/0035465 | A1 * | 2/2008 | Muromachi | 200/573 |

FOREIGN PATENT DOCUMENTS

| | | |
|---|---|---|
| JP | 2000025565 A | 1/2000 |
| JP | 2008-041583 A | 2/2008 |

OTHER PUBLICATIONS

Japanese Office Action dated Feb. 3, 2015 and English translation of the notice of reasons of rejection.

* cited by examiner

*Primary Examiner* — Robert J Sandy
*Assistant Examiner* — David Upchurch
(74) *Attorney, Agent, or Firm* — Roberts Mlotkowski Safran & Cole P.C.

(57) ABSTRACT

Foreign objects that have entered inside an insertion body are suppressed from reaching a detector side. In a buckle device, when a tongue plate is attached, an ejector slides downwards inside a buckle body, opening a through hole in a partitioning wall of a lower cover at the upper side. A main body portion of a slider member of a buckle switch is inserted into the through hole, closing off a portion of the through hole that has been opened by the ejector. Hence it is suppressed that foreign objects discharged through an insertion through hole in the buckle body to outside the buckle body pass through the through hole and reach the buckle switch side further than the partitioning wall.

13 Claims, 9 Drawing Sheets

BUCKLE DEVICE

CROSS-REFERENCE TO RELATED APPLICATION

This application claims priority under 35 USC 119 from Japanese Patent Application No. 2012-003512 filed Jan. 11, 2012, the disclosure of which is incorporated by reference herein.

BACKGROUND OF THE INVENTION

1. Field of the Invention

The present invention relates to a buckle device that is inserted inside with a tongue provided to a belt that is installed at a vehicle.

2. Related Art

In a belt buckle disclosed in Japanese Patent Application Laid-Open (JP-A) No. 2000-25565, an insertion tongue-shaped body is inserted into a housing and an insertion tongue-shaped body ejector portion is moved. A groove is formed inside the housing, the insertion tongue-shaped body ejector portion is disposed inside the groove, and a foreign object that has entered inside the housing passes through the groove and is discharged to the outside of the housing.

A detector provided inside the housing of such a belt buckle is considered. In such a case, an interaction member is provided to the detector and the interaction member interacts (communicates) with the insertion tongue-shaped body ejector portion. The detector accordingly detects insertion of the insertion tongue-shaped body into the housing from movement of the interaction member due to the interaction member being moved accompanying movement of the insertion tongue-shaped body ejector portion.

Here, it is desirable to be able to suppress a foreign object that has entered inside the housing, through an insertion opening into which the insertion tongue-shaped body is inserted, from reaching the detector side.

Accordingly, if the detector is disposed at an outside region to the groove in the housing. However, even in this case, since it is necessary to form a through hole in a peripheral wall of the groove through which the insertion tongue-shaped body ejector portion communicates with the interaction member, it is desirable to be able to suppress a foreign object passing through the groove from reaching the detector side via the through hole.

SUMMARY OF THE INVENTION

In consideration of the above circumstances, the present invention is to provide a buckle device capable of suppressing foreign objects that have entered into an insertion body from reaching a detector side.

A buckle device of a first aspect includes: an insertion body that is installed in a vehicle, a tongue provided at a belt installed in the vehicle being inserted into an inside portion of the insertion body whereby the belt is applied on a vehicle occupant; a moving member that is provided inside the insertion body, the moving member being moved according to insertion of the tongue inside the insertion body; a detector that is provided inside the insertion body and that includes a communication member communicating with the moving member, the communication member being moved according to movement of the moving member, and the detector detecting insertion of the tongue inside the insertion body by movement of the communication member; and a partitioning section that is provided inside the insertion body to partition between the moving member side and the detector side of the insertion body and that includes a through hole for communication between the moving member and the communication member, the communication member closing a portion of the through hole which portion is opened by the movement of the moving member.

A buckle device of a second aspect is the buckle device of the first aspect wherein the communication member includes a guide portion that guides a foreign object that has entered into the insertion body to the moving member side with respect to the through hole.

A buckle device of a third aspect is the buckle device of the second aspect wherein the guide portion restricts the foreign object from being caught on the communication member.

A buckle device of a fourth aspect is the buckle device of any one of the first aspect to the third aspect wherein the moving member is disposed at a movement direction (a moving direction of the communication member when the tongue is inserted into the inside portion of the insertion body) side with respect to the communication member, and a communication portion that communicates with the moving member is disposed at a portion on the movement direction side of the communication member.

It is possible in any one of the first aspect to the fourth aspect that, when the tongue has been inserted into the inside portion of the insertion body, the communication member is inserted in the through hole so as to close the portion of the through hole which portion is opened by the movement of the moving member.

It is possible in any one of the first aspect to the fourth aspect that the guide portion is configured by plural convex portions that protrude from a face at the moving member side of the communication member towards the moving member side.

In the buckle device of the first aspect, the vehicle installed belt is applied around the occupant by the tongue provided at the belt being inserted into the inside of the insertion body. Moreover, the moving member is provided inside the insertion body and moves accompanying insertion of the tongue inside the insertion body.

The detector is provided inside the insertion body, and the communication (interaction) member of the detector communicates (interacts) with the moving member and is moved accompanying movement of the moving member, and the detector detects insertion of the tongue to inside the insertion body by movement of the communication member.

The partitioning section is provided inside the insertion body to partition between the moving member side and the detector side, and the through hole is provided at the partitioning section for communication between the moving member and the communication member.

The portion of the through hole that is opened by the movement of the moving member is closed off by the communication member. The foreign object that has entered into the insertion body can accordingly be suppressed from reaching the detector side via the through hole.

In the buckle device of the second aspect, the guide portion provided at the communication member guides the foreign object that has entered into the insertion body to the moving member side with respect to the through hole. The foreign object that has entered into the insertion body can accordingly be more effectively suppressed from reaching the detector side via the through hole.

In the buckle device of the third aspect, the guide portion restricts the foreign object from being caught on the communication member. It is suppressed that the foreign object that has been caught on the interaction member enters to the detector side with respect to the through hole due to the movement of the communication member, and the foreign object can be more effectively suppressed from reaching the detector side via the through hole.

In the buckle device of the fourth aspect, the moving member is disposed at the movement direction side of the communication member, and a communication portion communicating with the moving member is disposed at a portion on the movement direction side of the communication member. The portion of the communication member, which is at the opposite side of the movement direction side than the communication portion, can accordingly be made large, and the portion of the through hole opened by the moving member can be effectively closed off by the communication member, and the foreign object that has entered into the insertion body can be more effectively suppressed from reaching the detector side via the through hole.

BRIEF DESCRIPTION OF THE DRAWINGS

Embodiments of the invention will be described in detail with reference to the following figures, wherein.

DETAILED DESCRIPTION OF THE INVENTION

Figure 7:
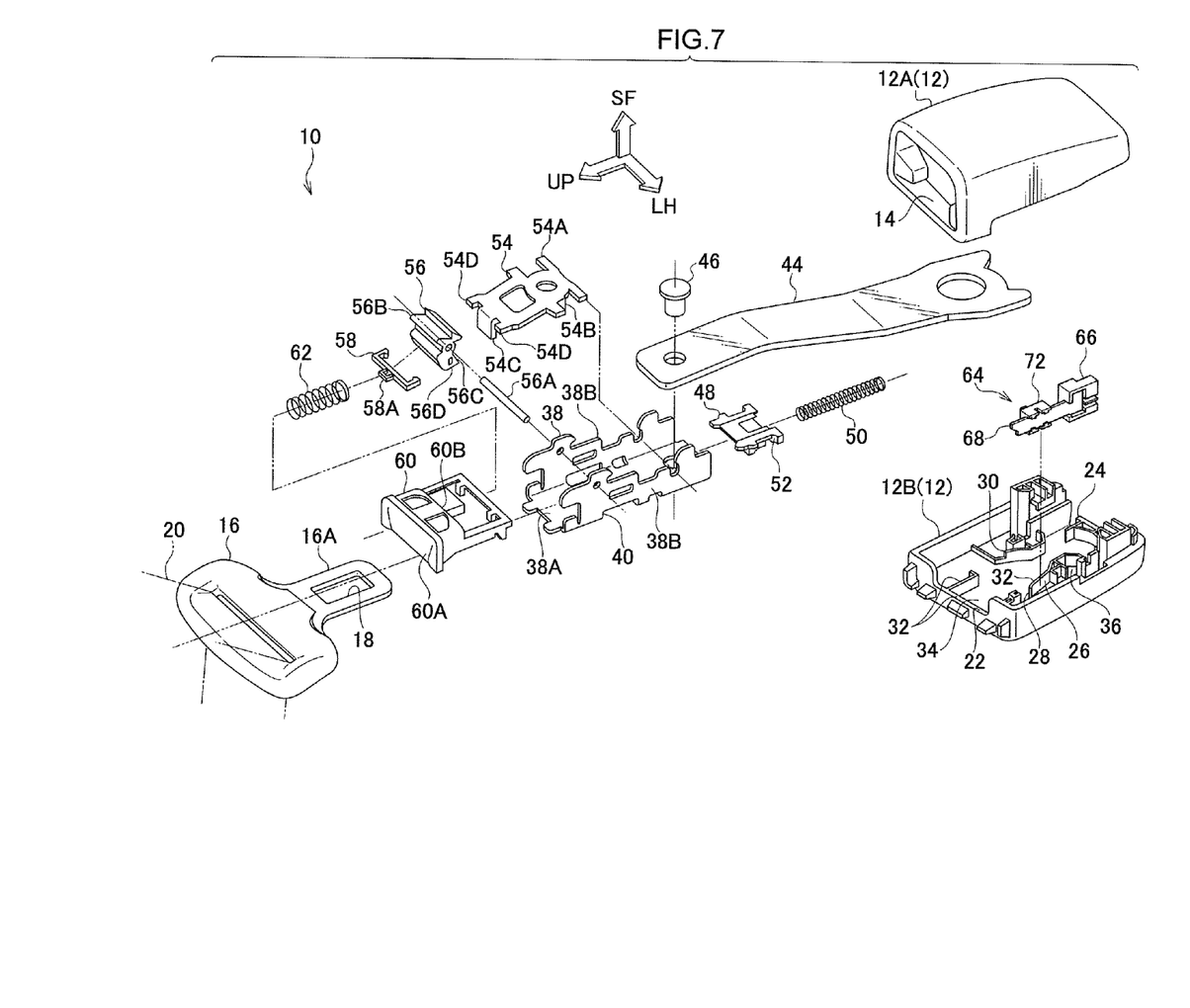
FIG. 7 is an exploded perspective view illustrating a buckle device and tongue plate according to an exemplary embodiment of the present invention as seen from diagonally to the left and front.
Figure 8:
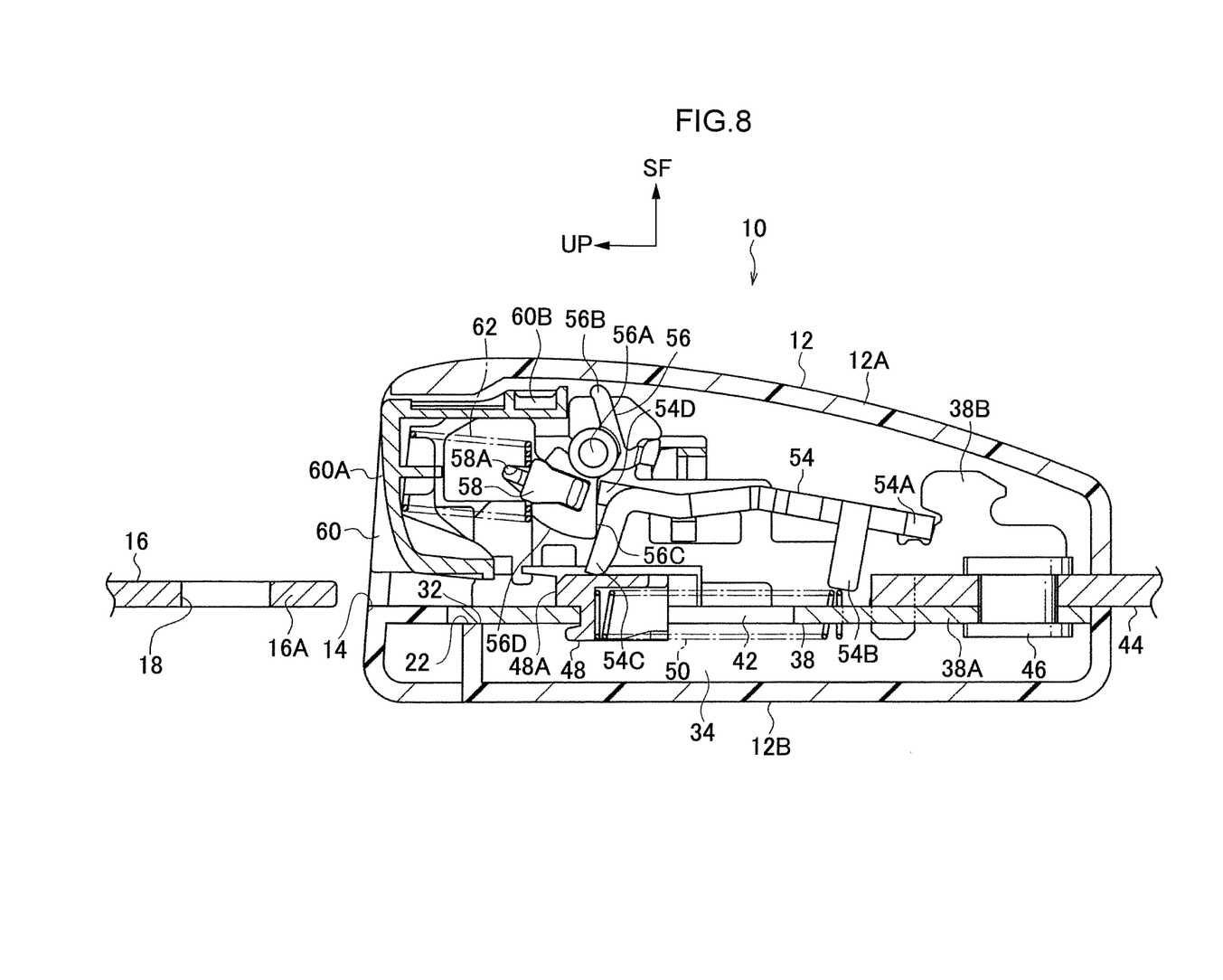
FIG. 8 is a cross-section illustrating a buckle device and tongue plate according to an exemplary embodiment of the present invention as seen from the left.

FIG. 7 illustrates an exploded perspective view of a buckle device 10 according to an exemplary embodiment of the present invention as seen from diagonally to the front surface side and the left. FIG. 8 is a cross-section illustrating the buckle device 10 as seen from the left. Note that in the drawings the upper side of the buckle device 10 is indicated by the arrow UP, the front surface side of the buckle device 10 (one thickness direction) is indicated by the arrow SF, and the left of the buckle device 10 is indicated by the arrow LH.

The buckle device 10 according to the present exemplary embodiment is installed at the lower side and left hand side (one side direction) of a vehicle seat and is arranged at the lower side and left hand side of a vehicle occupant seated on the seat. The upper side of the buckle device 10 is directed towards the vehicle upper side, the left hand side of the buckle device 10 is directed towards the vehicle front side, and the back side of the buckle device 10 (the other thickness direction) is directed towards the seat side (vehicle occupant side).

The upper side of the buckle device 10 is tilted towards the vehicle front side, and the left hand side of the buckle device 10 is disposed to the vehicle lower side with respect to the right hand side of the buckle device 10. The upper side of the buckle device 10 is also tilted towards the vehicle right hand side (the other side direction), and the back side of the buckle device 10 is disposed to the vehicle lower side with respect to the front surface side of the buckle device 10. The buckle device 10 is accordingly disposed towards the vehicle lower side on progression towards the lower side, left side and back side.

As illustrated in FIG. 7 and FIG. 8, a substantially rectangular tube shaped cover 12 made of resin is provided, serving as an insertion body, at the buckle device 10. The inside of the cover 12 is open towards the upper side and the lower side. A tongue insertion opening 14 is formed in the upper end of the cover 12. A tongue plate 16 serving as a tongue is insertable into the tongue insertion opening 14 from the upper side. A rectangular flat plate shaped insertion portion 16A is provided to the leading end portion of the tongue plate 16. The insertion portion 16A of the tongue plate 16 is capable of being inserted (fitted) into the tongue insertion opening 14. A rectangular shaped engagement hole 18 is formed piercing through the insertion portion 16A. An elongated belt shaped webbing 20 serving as a belt for restraining an vehicle occupant passes moveably through a base end portion of the tongue plate 16. The webbing 20 is installed to a vehicle in a wound state on a take-up device (not shown in the drawings).

The cover 12 is configured by assembling together an upper cover 12A serving as a covering member and a lower cover 12B serving as a discharge member. The upper cover 12A configures an upper end portion of the cover 12 and the front surface side portion at portion other than the upper end portion of the cover 12. The lower cover 12B configures the back side portion at portion other than the upper end portion of the cover 12.

The lower cover 12B is substantially rectangular box shaped, and the inside of the lower cover 12B is open towards the front surface side (the upper cover 12A side). A rectangular shaped placement hole 22 is formed piercing through a left-right direction intermediate portion of an upper wall of the lower cover 12B, and the placement hole 22 is open towards the front surface side. Rectangular shaped discharge holes 24 are formed piercing through a left portion and a right portion of a lower wall of the lower cover 12B. The discharge holes 24 are open towards the front surface side, and the back side end faces of the discharge holes 24 are in the same plane as a back side wall (bottom wall) of the lower cover 12B.

As illustrated in FIG. 1 to FIG. 4, a plate shaped partitioning wall 26 serving as a partitioning portion is integrally provided to a left hand side portion of the back side wall of the lower cover 12B. The partitioning wall 26 protrudes out from the back side wall of the lower cover 12B towards the front surface side, and is disposed spanning from the upper wall to the lower wall of the lower cover 12B.

An upper portion of the partitioning wall 26 is configured by a flat plate shaped first wall 26A. The first wall 26A is disposed perpendicular to the left-right direction, and is connected to the forming position of the placement hole 22 in the upper wall of the lower cover 12B.

A portion of the partitioning wall 26 that is at the lower side with respect to the first wall 26A is configured by a substantially U-shaped cross-section second wall 26B. The second wall 26B projects out to the left hand side with respect to the first wall 26A. An upper portion of the second wall 26B is disposed perpendicular to the up-low direction, a left portion of the second wall 26B is disposed perpendicular to the left-right direction, and a lower portion of the second wall 26B slopes in a direction towards the right hand side on progression downwards.

A through hole 28 is formed piercing through a portion of the second wall 26B excluding the upper side end and the lower side end of the second wall 26B. The through hole 28 is open towards the front surface side. The upper side end face and the lower side end face of the through hole 28 are disposed perpendicular to the left-right direction, and positions thereof are at the same left-right direction position as the left hand side end face of the placement hole 22 of the upper wall of the lower cover 12B.

A portion of the partitioning wall 26 that is at the lower side with respect to the second wall 26B is configured by a substantially J-shaped cross-section third wall 26C. The third wall 26C projects out to the right hand side with respect to the second wall 26B.

A portion of the partitioning wall 26 that is at the lower side with respect to the third wall 26C is configured by a flat plate shaped fourth wall 26D. The fourth wall 26D is disposed perpendicular to the left-right direction, and enters into the discharge hole 24, which is at the left hand side, of the lower wall of the lower cover 12B.

Figure 1:
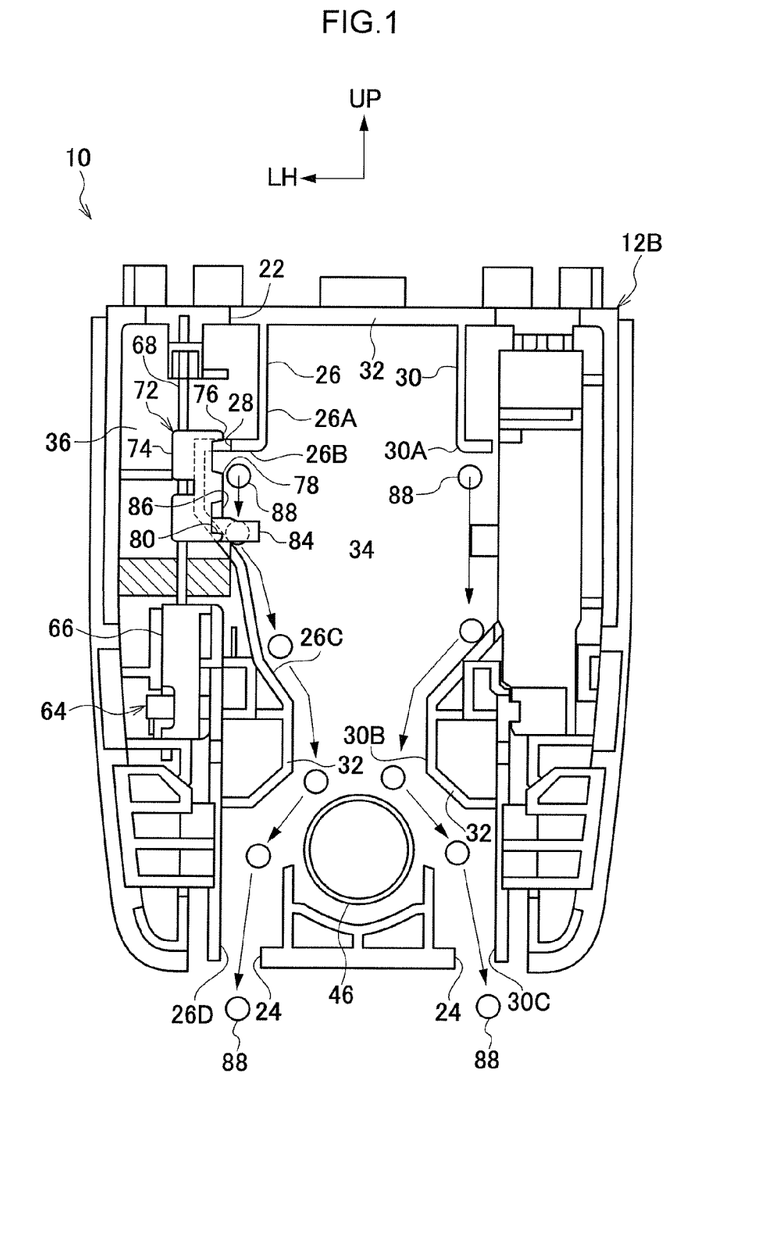
FIG. 1 is a surface-on view illustrating a lower cover and a buckle switch of a buckle device according to an exemplary embodiment of the present invention as seen from the front side.

As illustrated in FIG. 1 and FIG. 7, a plate shaped additional wall 30 is integrally provided serving as an additional partitioning portion at a right hand side portion of the back side wall of the lower cover 12B. The additional wall 30 projects out from the back side wall of the lower cover 12B towards the front surface side.

An upper portion of the additional wall 30 is configured by an L-shaped cross-section first additional wall 30A. An upper side portion of the first additional wall 30A is disposed perpendicular to the left-right direction, and is connected to the forming position where the placement hole 22 is formed in the upper wall of the lower cover 12B. A lower side portion of the first additional wall 30A is disposed perpendicular to the up-low direction and extends out towards the right side.

A portion of the additional wall 30 that is at the lower side with respect to the first additional wall 30A is configured by a substantially J-shaped cross-section second additional wall 30B. The second additional wall 30B is separated from the first additional wall 30A. An upper side portion of the second additional wall 30B is disposed perpendicular to the up-low direction and is connected to the right wall of the lower cover 12B. A lower side portion of the second additional wall 30B is disposed with a substantially C-shaped cross-section projecting out towards the left hand side.

A portion of the additional wall 30 that is at the lower side with respect to the second additional wall 30B is configured by a flat plate shaped third additional wall 30C. The third additional wall 30C is disposed perpendicular to the left-right direction and enters into the discharge hole 24, which is at the right hand side, of the lower wall of the lower cover 12B.

The back side end face of the placement hole 22 in the upper wall of the lower cover 12B, the front surface side end faces of the first wall 26A, the second wall 26B and the third wall 26C of the partitioning wall 26, and the front surface side end faces of the first additional wall 30A and the second additional wall 30B of the additional wall 30 are all in the same plane as each other and configure a seating face 32. A discharge space 34 is configured inside the lower cover 12B between the partitioning wall 26 and the additional wall 30. The discharge space 34 is open downwards by the discharge holes 24 in the lower wall of the lower cover 12B. A placement space 36 is configured inside the lower cover 12B between the left wall and the partitioning wall 26. The partitioning wall 26 partitions between the placement space 36 and the discharge space 34.

A U-shaped cross-section plate shaped buckle body 38 made of metal, serving as a partitioning section, is fixed inside the cover 12. The inside of the buckle body 38 is open to the front surface side (the upper cover 12A side). An elongated flat plate shaped bottom plate 38A configures a back side (lower cover 12B side) portion of the buckle body 38. The bottom plate 38A makes surface contact with the seating face 32 of the lower cover 12B and is disposed perpendicular to the front surface-back surface direction. Elongated flat plate shaped side plates 38B configure a left side portion and a right side portion of the buckle body 38. The side plates 38B are disposed perpendicular to the left-right direction. The side plate 38B on the left side makes surface contact with the left side end face of the placement hole 22 at the upper wall of the lower cover 12B, and is disposed at positions of the upper side end face and the lower side end face of the through hole 28 of the partitioning wall 26. The side plate 38B on the right side makes surface contact with the right side end face of the placement hole 22.

The inside of the buckle body 38 is partitioned from the discharge space 34 and from the placement space 36 of the lower cover 12B. The inside of the buckle body 38 is in communication with the tongue insertion opening 14 of the cover 12, and the insertion portion 16A of the tongue plate 16 that has been inserted into the tongue insertion opening 14 is inserted into the buckle body 38 from the upper side.

Figure 6:
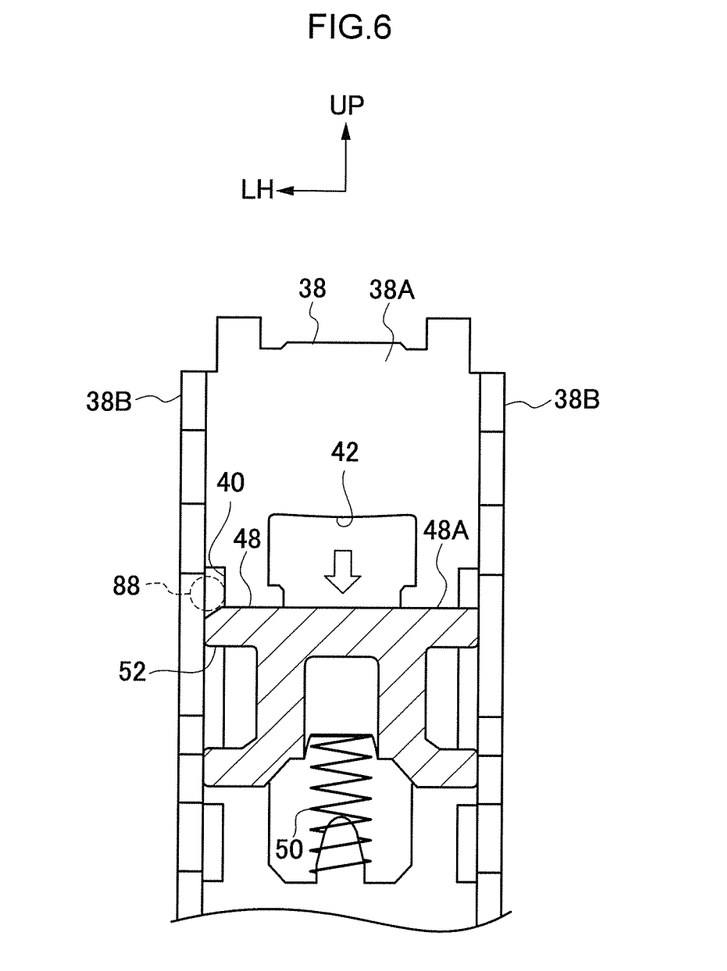
FIG. 6 is a face-on view illustrating a buckle body, ejector and ejector spring of a buckle device according to an exemplary embodiment of the present invention as seen from the surface side.

As illustrated in FIG. 6 and FIG. 7, an insertion through hole 40 is formed piercing through the boundary portion between the bottom plate 38A and the left hand side side plate 38B of the buckle body 38, at the up-low direction position of the through hole 28 in the partitioning wall 26 of the lower cover 12B. The insertion through hole 40 is elongated along the up-low direction and communicates the inside of the buckle body 38 with the discharge space 34 of the lower cover 12B. As illustrated in FIG. 6 and FIG. 8, an insertion hole 42 is formed piercing through the bottom plate 38A of the buckle body 38. The insertion hole 42 is elongated along the up-low direction.

As illustrated in FIG. 7 and FIG. 8, a long plate shaped anchor plate 44 is inserted from the lower side of the upper cover 12A into the cover 12. The leading end portion (the upper end portion) of the anchor plate 44 is fixed to a lower end portion of the bottom plate 38A of the buckle body 38 by a rivet 46. The rivet 46 has a substantially circular column shape and pierces through the bottom plate 38A and the anchor plate 44. A head portion and a leg portion of the rivet 46 have widened diameters, and the bottom plate 38A and the anchor plate 44 are nipped between the head portion and the leg portion of the rivet 46. The anchor plate 44 extends from the cover 12 towards the lower side, and a base end portion (lower end portion) of the anchor plate 44 is fixed to the vehicle body or seat, thereby installing the buckle device 10 to the vehicle.

Figure 9:
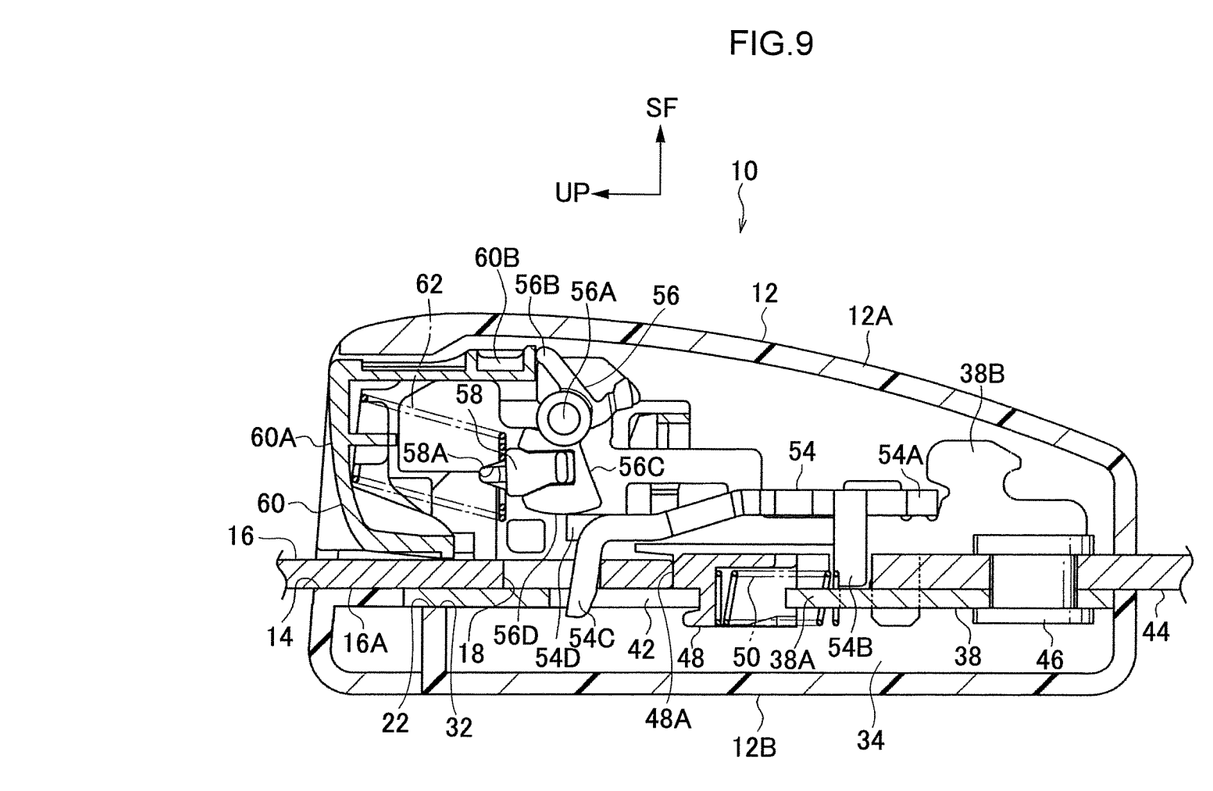
FIG. 9 is a cross-section illustrating an attached state of a buckle device and tongue plate according to an exemplary embodiment of the present invention as seen from the left.

As illustrated in detail in FIG. 6, a substantially plate shaped ejector 48 that is made from resin and serves as a moving member is inserted in the buckle body 38. The ejector 48 fits between the pair of side plates 38B of the buckle body 38. A back side (lower cover 12B side) portion of the ejector 48 is engaged with the insertion hole 42 of the bottom plate 38A of the buckle body 38, so the ejector 48 is capable of sliding with respect to the bottom plate 38A in the up-low direction within a specific range. The ejector 48 is capable of being positioned in a discharge position at the upper side as illustrated in FIG. 8, or in an insertion position at the lower side as illustrated in FIG. 9.

An ejector spring 50 serving as a biasing section spans between the ejector 48 and the lower end of the insertion hole 42 of the buckle body 38, at the lower side of the ejector 48. The ejector spring 50 is configured by a compression coil spring and biases the ejector 48 upwards to dispose the ejector 48 in the discharge position. A press face 48A is formed on the upper side face of the front surface side (upper cover 12A side) portion of the ejector 48. The press face 48A is pressed downwards by the insertion portion 16A when the insertion portion 16A of the tongue plate 16 is inserted into the buckle body 38 from the upper side. The ejector 48 is thereby slid downwards against biasing force of the ejector spring 50 and disposed in the insertion position.

The press face 48A of the ejector 48 is configured in a flat plane shape perpendicular to the up-low direction other than at a left end portion. The left end portion of the press face 48A is a flat plane shaped sloping face that slopes downwards on progression towards the left hand side. The press face 48A is disposed at the upper side with respect to the insertion through hole 40 of the buckle body 38 (in FIG. 6, the ejector 48 is illustrated in a state slid downwards and disposed in the insertion position), such that the ejector 48 closes off the buckle body 38 internal side of the insertion through hole 40 from the upper side. An elongated rectangular shaped cross-section engagement indentation (concave) 52 is formed in the left end portion of the ejector 48, with the engagement indentation 52 being elongated along the up-low direction and open towards the left hand side.

As illustrated in FIG. 7 and FIG. 8, a plate shaped lock plate 54 serving as an anchor member is disposed inside the cover 12 at the front surface side (the upper cover 12A side) of the ejector 48. A pair of supported portions 54A is formed at a lower end portion of the lock plate 54. The supported portions 54A project out towards left-right direction outsides. The supported portions 54A are rotatably supported by the side plates 38B of the buckle body 38. The lock plate 54 is accordingly supported by the pair of side plates 38B so as to be capable of rotating (swinging) a specific angle about the pair of supported portions 54A.

A pair of arm portions 54B are formed to the lock plate 54 at the upper side with respect to the pair of supported portions 54A. The arm portions 54B extend from both left-right direction ends of the lock plate 54 upwards on progression towards the back side (the lower cover 12B side). The arm portions 54B are inserted into the buckle body 38, and when the ejector 48 slides downwards, the pair of arm portions 54B are pressed downwards by the ejector 48, and the lock plate 54 is rotated towards the back side (an engagement position side).

An engagement tab 54C is formed at the upper end of the lock plate 54. The engagement tab 54C extends upwards on progression towards the back side. The engagement tab 54C interferes with the front surface side face of the ejector 48, thereby preventing the lock plate 54 from rotating (swinging) towards the back side, therefore retaining the lock plate 54 in a release position. As illustrated in FIG. 9, when the lock plate 54 swings towards the back side and reaches the engagement position, the engagement tab 54C inserts into the engagement hole 18 of the tongue plate 16 and the insertion hole 42 of the buckle body 38, and stops the tongue plate 16 sliding upwards.

As illustrated in FIG. 7 and FIG. 8, a pair of contact (abut) tabs 54D are formed, at both the left-right direction outsides with respect to the engagement tab 54C, at the upper end of the lock plate 54. The contact tabs 54D project towards the upper side.

A column shaped lock member 56 (cam) is provided inside the cover 12 at the front surface side (the upper cover 12A side) and the upper side with respect to the lock plate 54. The lock member 56 is disposed along the left-right direction. A circular column shaped shaft 56A projects out from both left-right direction ends of the lock member 56 and the shaft 56A is rotatably supported by the side plates 38B of the buckle body 38. The lock member 56 is thus supported by the buckle body 38 so as to be capable of swinging about the shaft 56A.

A substantially plate shaped pressed portion 56B is formed to a front side portion of the lock member 56. The pressed portion 56B projects out towards the front side.

A lower face of a back side (lower cover 12B side) portion of the lock member 56 configures a contact (abut) face 56C. The contact face 56C makes contact with the upper side faces of the contact tabs 54D of the lock plate 54 and the lock member 56 is retained in an unlocked position.

The back side face of the lock member 56 configures a lock face 56D. The lock face 56D is a circular peripheral face coaxial to the shaft 56A. As illustrated in FIG. 9, the lock member 56 is retained in a locked position when the lock plate 54 is disposed in the engagement position, with the lock face 56D making contact with the front surface side faces of the contact tabs 54D of the lock plate 54.

As illustrated in FIG. 7 and FIG. 8, a substantially U-frame shaped holder 58 made from resin is attached, from the upper side, to a back side (lower cover 12B side) portion of the lock member 56 at both left-right direction ends. A substantially rectangular plate shaped spring holder portion 58A is formed at the left-right direction center of the holder 58. The spring holder portion 58A projects out towards the upper side.

A release button 60 serving as an insertion member is provided at the upper side with respect to the lock member 56. The upper face of the release button 60 is exposed from the upper end of the cover 12. A box shaped operation portion 60A is provided to an upper side portion of the release button 60. The operation portion 60A is capable of being press-operated downwards by an occupant, and the inside of the operation portion 60A is open towards the lower side. The tongue insertion opening 14 at the upper end of the cover 12 is formed between the operation portion 60A and the lower cover 12B.

A lower side portion of the release button 60 engages with the pair of side plates 38B of the buckle body 38 so as to be capable of moving in the up-low directions. The release button 60 is thereby supported by the buckle body 38 so as to be capable of moving within a specific range in the up-low directions.

A pressing portion 60B is formed to the release button 60 at the front surface side (the upper cover 12A side) and the lower side of the operation portion 60A. The pressing portion 60B projects out towards the lower side. The pressing portion 60B is disposed at the upper side with respect to the pressed portion 56B of the lock member 56. The pressed portion 56B is pressed downwards by the pressing portion 60B when the release button 60 is press-operated downwards, thereby swinging the lock member 56 towards the unlocked position side about the shaft 56A.

A lock spring 62 spans between the upper wall of the operation portion 60A of the release button 60 and the spring holder portion 58A of the holder 58. The lock spring 62 is configured by a compression coil spring and biases the lock member 56 via the holder 58 towards the locked position side.

A buckle switch 64 (contact switch) serving as a detector (electrical mechanism) is attached in the placement space 36 of the lower cover 12B.

As illustrated in detail in FIG. 1 to FIG. 4, a substantially cuboid body shaped substrate base 66 (holder) is provided at a lower portion of the buckle switch 64.

The lower end of an elongated rectangular plate shaped switch substrate 68 (stator) serving as a support member is fixed to the substrate base 66. The switch substrate 68 extends out from the substrate base 66 upwards. The switch substrate 68 is disposed perpendicular to the left-right direction, and plural (3 in the present exemplary embodiment) conductive patterns 70 serving as conducting portions are formed as metal foil layers on the right hand side face (one side face) of the switch substrate 68. The plural conductive patterns 70 are insulated from each other, and are each electrically connected to a vehicle controller (not shown in the drawings).

A substantially rectangular parallelopiped shaped slider member 72 (slider) serving as a communication member is supported on the right hand side of the switch substrate 68. The slider member 72 is capable of sliding in the up-low directions along the switch substrate 68. The slider member 72 is capable of making plural conductive patterns 70 of the switch substrate 68 electrically continuity (conducting) to each other. The slider member 72 changes the combination of the conductive patterns 70 that are electrically conducted to each other according to the sliding position thereof.

A substantially rectangular parallelopiped shaped main body portion 74 is provided at the slider member 72. The main body portion 74 is disposed so as to be capable of sliding inside the through hole 28 of the partitioning wall 26 of the lower cover 12B, and the right hand side face of the main body portion 74 is disposed at the right hand side with respect to a left portion of the through hole 28.

Figure 5:
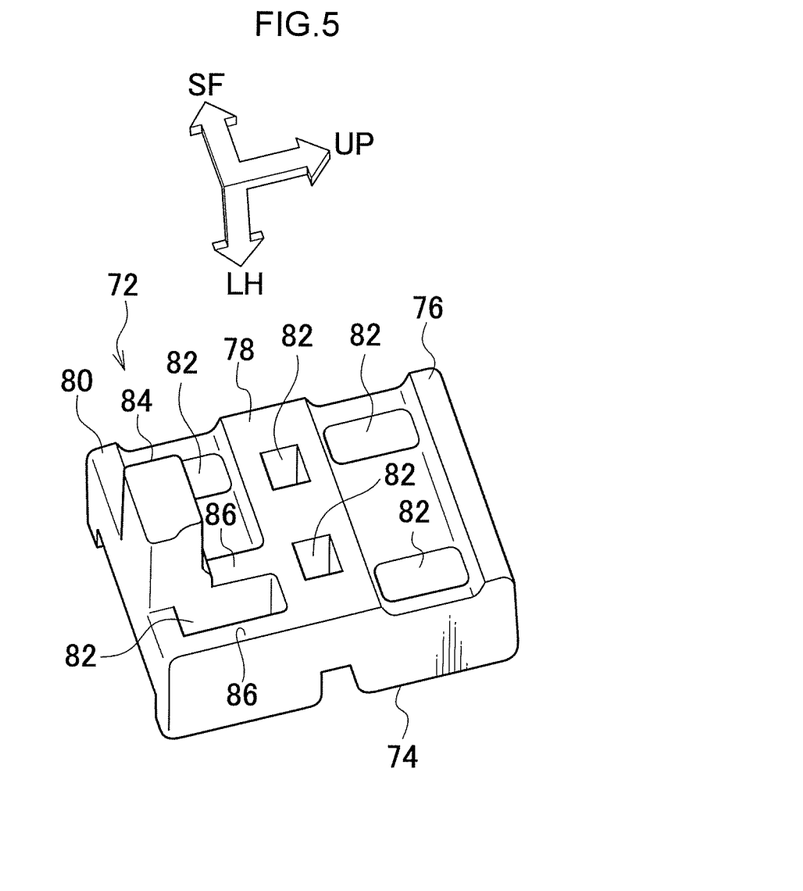
FIG. 5 is a perspective view illustrating a slider member of a buckle device according to an exemplary embodiment of the present invention as seen from diagonally to the right and back.

As illustrated in detail in FIG. 5, a first protrusion 76, a second protrusion 78 and a third protrusion 80 which are elongated rectangular column shape are respectively formed at an upper end, up-low direction center portion and lower end of the right side face (the ejector 48 side face side) of the body portion 74, respectively serving as guide portions (protrusion (convex) portions). The first protrusion 76, the second protrusion 78 and the third protrusion 80 project out towards the right hand side (towards the ejector 48 side) and are disposed so as to span (across) overall of the main body portion 74 along the front surface-back surface direction (the facing direction of the upper cover 12A and the lower cover 12B). The main body portion 74 is formed with plural rectangular shaped small holes 82. The small holes 82 each pierces through the main body portion 74 in the left-right direction and has small width direction dimension (the smaller the preferable, for example set at less than 2.5 mm, less than 2 mm, or less than 1.5 mm). The small holes 82 are disposed between portions on the front surface side (on the upper cover 12A side) and the back side (on the lower cover 12B side) of the body portion 74 between the first protrusion 76 and the second protrusion 78, between the second protrusion 78 and the third protrusion 80, and are disposed between portions on the front surface side and the back side of the second protrusion 78.

A substantially rectangular column shaped boss 84 (engagement projection) serving as a communication portion and a guiding portion is provided at a front surface-back surface direction central portion of the lower end of the right side face of the body portion 74. The boss 84 extends out towards the right hand side (towards the ejector 48 side). A lower portion of the boss 84 is integrated to the third protrusion 80, and the lower face of the boss 84 is in the same plane as the lower face of the body portion 74.

The boss 84 passes through the insertion through hole 40 of the buckle body 38 and is capable of sliding in the up-low direction. The boss 84 is elongated along the front surface-back surface direction, is fitted in the front surface-back surface direction between the bottom plate 38A of the buckle body 38 and the front surface side end face of the insertion through hole 40. A gap dimension in the front surface-back surface direction between the boss 84 and the back side end face of the through hole 28 in the partitioning wall 26 of the lower cover 12B is set smaller.

A pair of elongated rectangular column shaped ribs 86 serving as a guide portion and a restricting portion are formed at a lower side portion of the right side face of the main body portion 74. The ribs 86 project out to the right hand side and are elongated along the up-low direction. The rib 86 on the back side spans between the back side ends of the second protrusion 78 and the third protrusion 80. The rib 86 on the front side spans between the front surface-back surface direction intermediate portion of the second protrusion 78 and the back side end of the boss 84. The right side faces (project end faces) of the ribs 86 are in the same plane as the right side faces (project end faces) of the second protrusion 78 and the third protrusion 80.

The boss 84 of the slider member 72 is inserted into the engagement indentation (concave) 52 of the ejector 48. The boss 84 makes contact with the lower end face of the engagement indentation 52 in a state in which it is separated from the upper end face of the engagement indentation 52, and the slider member 72 is disposed in a discharge position as illustrated in FIG. 3. When the insertion portion 16A of the tongue plate 16 has been inserted into the tongue insertion opening 14 at the upper end of the cover 12, due to the ejector 48 sliding downwards, the boss 84 is pressed downwards by the upper end face of the engagement indentation 52, and the slider member 72 accordingly slides downwards. The slider member 72 thus becomes disposed in the insertion position illustrated in FIG. 1 and FIG. 2.

When the slider member 72 is disposed in the discharge position, a first combination is set (selected) among combinations in which conductive patterns 70 among the plural conductive patterns 70 of the switch substrate 68 are electrically connected to each other by the slider member 72. The fact that the insertion portion 16A of the tongue plate 16 has not been inserted into the tongue insertion opening 14 at the upper end of the cover 12 is accordingly detected by the buckle switch 64. On the other hand, when the slider member 72 is disposed in the insertion position, a second combination is set (selected) among combinations in which conductive patterns 70 among the plural conductive patterns 70 of the switch substrate 68 are electrically connected to each other by the slider member 72. The fact that the insertion portion 16A of the tongue plate 16 has been inserted into the tongue insertion opening 14 at the upper end of the cover 12 is accordingly detected by the buckle switch 64.

Irrespective of the sliding position of the slider member 72, the maximum gap dimension between the slider member 72 and the end face of the through hole 28 of the partitioning wall 26 of the lower cover 12B is set small (the smaller the preferable, for example set at less than 2.5 mm, less than 2 mm or less than 1.5 mm).

Explanation follows regarding operation of the present exemplary embodiment.

In the buckle device 10 configured as described above, when the insertion portion 16A of the tongue plate 16 is inserted from the tongue insertion opening 14 at the upper end of the cover 12, the press face 48A of the ejector 48 is pressed downwards by the leading end (lower end) of the insertion portion 16A. The ejector 48 is accordingly slid downwards against biasing force of the ejector spring 50, and slid from the discharge position to the insertion position. When this occurs, the boss 84 of the slider member 72 of the buckle switch 64 is pressed downwards by the upper end face of the engagement indentation 52 of the ejector 48, and the slider member 72 is thereby slid downwards, in a state in which the slider member 72 is disposed at the upper side to the ejector 48, sliding from the discharge position to the insertion position.

When the ejector 48 reaches the insertion position, the facing state of the front surface side face (the upper cover 12A side face) of the ejector 48 and the engagement tab 54C of the lock plate 54 is released. Moreover, the ejector 48 presses the pair of arm portions 54B of the lock plate 54 downwards, and so the lock plate 54 rotates (swings) towards the back side (lower cover 12B side), and thereby rotates (swings) from the release position to the engagement position. The engagement tab 54C thereby passes through the engagement hole 18 of the insertion portion 16A and the insertion hole 42 of the buckle body 38.

The lock plate 54 receives biasing force of the lock spring 62 through the holder 58 and the lock member 56, and the lock plate 54 is accordingly swung, against the biasing force of the lock spring 62, from the release position towards the engagement position as described above. When the lock plate 54 reaches the engagement position, the contacting state of the contact tabs 54D of the lock plate 54 and the contact face 56C of the lock member 56 is released, the lock face 56D of the lock member 56 makes contact with the front surface side face of the contact tabs 54D due to the lock member 56 being swung by the biasing force of the lock spring 62 from the unlocked position to the locked position. Swinging of the lock plate 54 from the engagement position to the release position is accordingly restricted, and the tongue plate 16 is retained in an anchored state at the engagement tab 54C of the lock plate 54. The buckle device 10 thus achieves the attached state (anchored state) to the tongue plate 16, and the webbing 20 inserted through the tongue plate 16 is applied over the occupant.

On the other hand, in the tongue plate 16 attached state to the buckle device 10, when the operation portion 60A of the release button 60 is press operated downwards, the pressed portion 56B of the lock member 56 is pressed towards the lower side by the pressing portion 60B of the release button 60, and the lock member 56 is swung against biasing force of the lock spring 62 from the lock position to the unlock position.

The contacting state between the lock face 56D of the lock member 56 and the contact tabs 54D of the lock plate 54 is accordingly released, and restriction by the lock member 56 to the lock plate 54 swinging from the engagement position to the release position is also released. Moreover, a component force towards the front surface side (the upper cover 12A side) acts on the engagement tab 54C due to biasing force of the ejector spring 50 acting via the ejector 48 and the insertion portion 16A of the tongue plate 16 on the engagement tab 54C of the lock plate 54. The lock plate 54 is accordingly swung from the engagement position to the release position by this component force acting on the engagement tab 54C, thereby releasing anchoring of the tongue plate 16 by the engagement tab 54C. When the ejector 48 is accordingly slid upwards by the biasing force of the ejector spring 50 and from the insertion position reaches the discharge position, the insertion portion 16A of the tongue plate 16 is ejected from the tongue insertion opening 14 at the upper end of the cover 12 due to sliding of the ejector 48. The buckle device 10 thereby achieves an non-attached state (non-anchor state) with the tongue plate 16, and the webbing 20 inserted through the tongue plate 16 is released from being applied over the occupant.

At this time, the engagement tab 54C interferes with the front side face of the ejector 48, and the contact face 56C of the lock member 56 makes contact with the contact tabs 54D of the lock plate 54 due to the biasing force of the lock spring 62 by the release of the press operation downwards of the release button 60 (the operation portion 60A). Moreover, the boss 84 of the slider member 72 of the buckle switch 64 is pressed upwards by the lower end face of the engagement indentation portion 52 of the ejector 48, and so the slider member 72 is slid upwards and slid from the insertion position to the discharge position.

In the buckle switch 64, when the slider member 72 is in the discharge position, the combination of the plural conductive patterns 70 of the switch substrate 68 that are electrically connected to each other by the slider member 72 is the first combination. The vehicle controller accordingly determines that the buckle device 10 is in the non-attached state. For example, when the non-fitted state of the buckle device 10 persists even after the engine has been started, the vehicle controller makes a warning lamp (not shown in the drawings) flash to prompt the occupant to place the buckle device 10 in the attached state.

On the other hand, when the slider member 72 is in the insertion position, the combination of the plural conductive patterns 70 of the switch substrate 68 that are electrically connected to each other by the slider member 72 is the second combination. The vehicle controller accordingly determines that the buckle device 10 is in the attached state, and, for example, actuates a motor (not shown in the drawings) of the webbing 20 take-up device to adjust the tension of the webbing 20 to a suitable value after the engine has been started.

In the buckle device 10, in the non-attached state of the tongue plate 16, the press face 48A of the ejector 48 which is in the discharge position is disposed at the upper side of the insertion through hole 40 of the buckle body 38, thereby closing off the inside of the buckle body 38 of the insertion through hole 40 from the upper side. Consequently, when a foreign object 88 (specifically solid object, with the smallest anticipated foreign object 88 being for example spherical rigid bodies with a diameter of 2.5 mm (here, a steel ball)) have entered (penetrated) through the tongue insertion opening 14 at the upper end of the cover 12 into the buckle body 38 at the inside of the cover 12, the foreign objects 88 are stopped (caught) by the press face 48A of the ejector 48 and penetration of the foreign objects 88 to the insertion through hole 40 is prevented. The foreign objects 88 moreover readily move to the lower side, the left side and the back side (lower cover 12B side) due to their own weight.

When the tongue plate 16 is attached to the buckle device 10, the ejector 48 is slid downwards, and the insertion through hole 40 of the buckle body 38 and the through hole 28 of the partitioning wall 26 of the lower cover 12B are open at a portion which is at the upper side from the left edge of the press face 48A (see FIG. 6).

The press face 48A of the ejector 48 is configured in a flat plane shape perpendicular to the up-low direction except at a left edge portion thereof, and the left edge portion is a flat plane shaped sloping face that slopes downwards on progression towards the left hand side. Any of the foreign objects 88 that have been stopped (caught) by the press face 48A of the ejector 48 can accordingly readily move on the press face 48A towards the left hand side due to their own weight, and are thereby able to pass through the insertion through hole 40 of the buckle body 38. The foreign objects 88 can accordingly be readily discharged into the discharge space 34 of the lower cover 12B, which is at the outside of the buckle body 38. The foreign objects 88 restricting sliding of the ejector 48 can accordingly be suppressed, and operation of the buckle device 10 being restricted by the foreign objects 88 can be suppressed.

Figure 2:
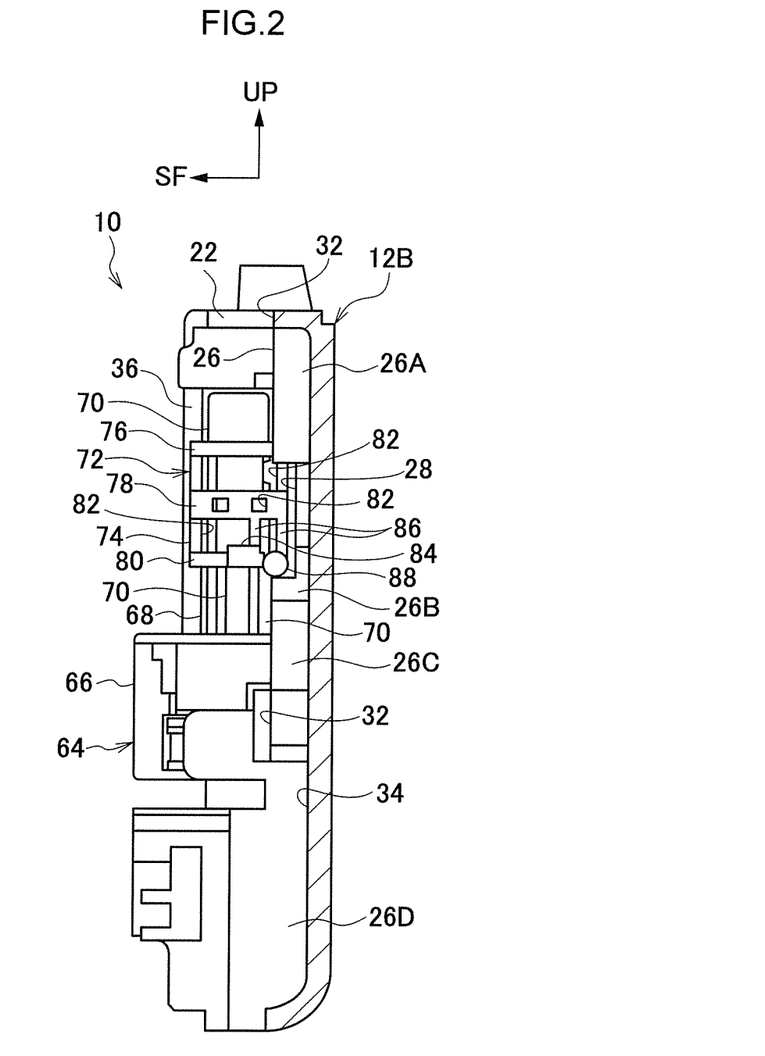
FIG. 2 is a side view illustrating a lower cover and a buckle switch of a buckle device according to an exemplary embodiment of the present invention as seen from the right side.
Figure 3:
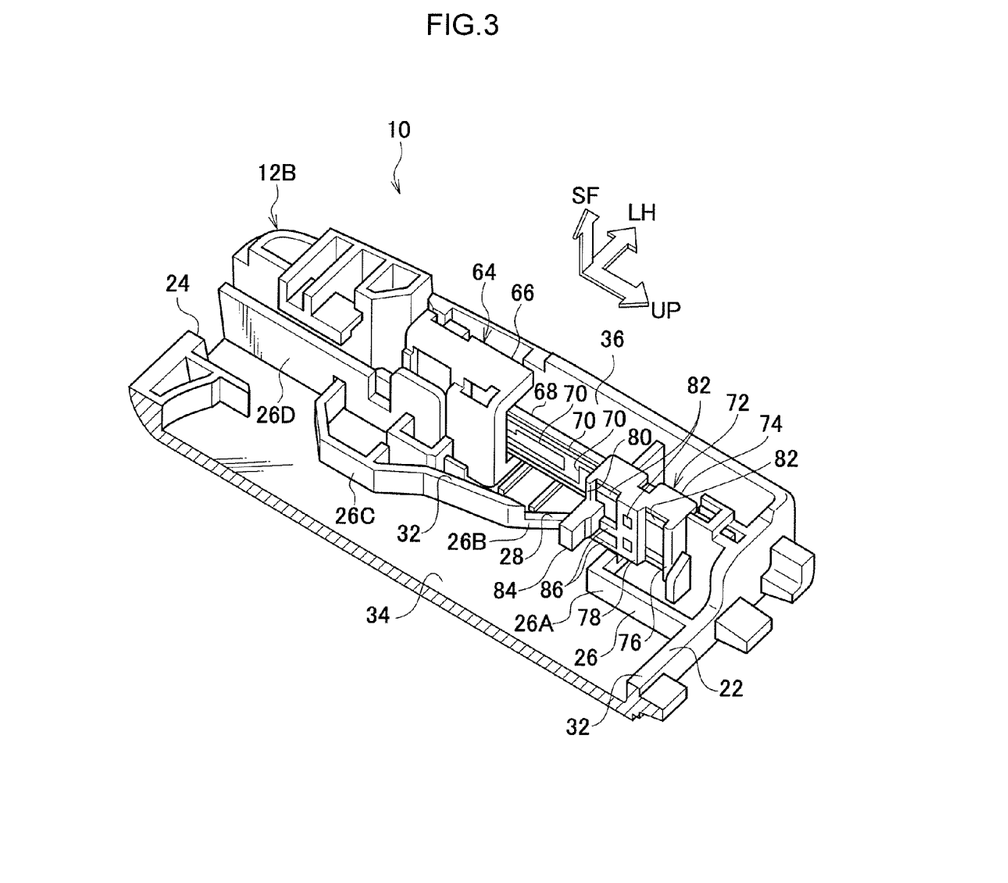
FIG. 3 is a perspective view illustrating a lower cover and a buckle switch of a buckle device according to an exemplary embodiment of the present invention as seen from diagonally above and to the front.
Figure 4:
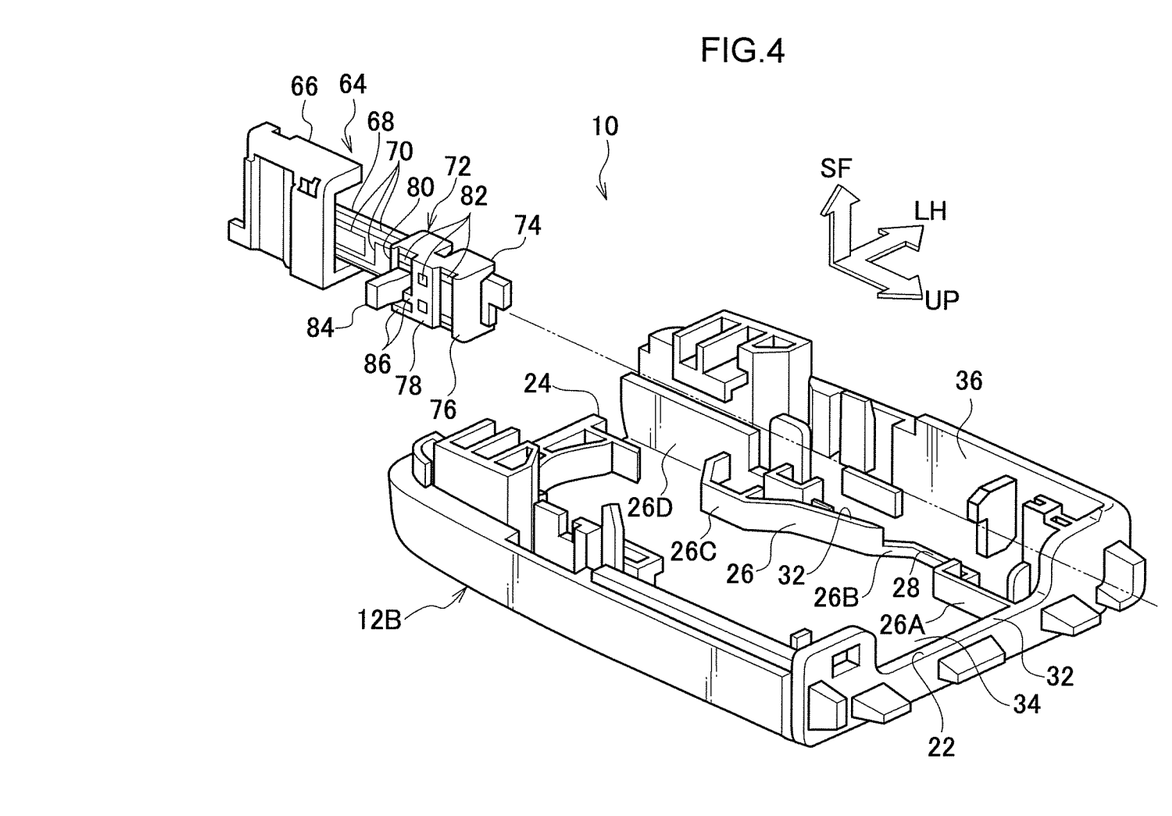
FIG. 4 is an exploded perspective view illustrating a lower cover and a buckle switch of a buckle device according to an exemplary embodiment of the present invention as seen from diagonally above and to the front.

Moreover, the main body portion 74 of the slider member 72 of the buckle switch 64 is inserted into the through hole 28 of the partitioning wall 26 of the lower cover 12B, and closes off at least the portion of the through hole 28, which is opened by the movement of the ejector 48 (the portion which is at the upper side from the left edge of the press face 48A of the ejector 48) (see FIG. 1 and FIG. 2). "The foreign objects 88 that have been discharged through the insertion through hole 40 to outside the buckle body 38 (to the discharge space 34 of the lower cover 12B) passing through the through hole 28 and penetrating (entering) to the placement space 36 of the lower cover 12B (reaching the buckle switch 64 side of the partitioning wall 26) can be suppressed.

Moreover, in the slider member 72, the boss 84 is disposed at the lower end of the right side face of the main body portion 74. The portion, which is at the upper side (at the opposite side of a moving direction of the main body portion 74 when the tongue plate 16 is attached to the buckle device 10) from the boss 84, of the main body portion 74 can accordingly be lengthened, and the main body portion 74 can close off the whole of the portion of the through hole 28, which is opened due to the ejector 48 (the portion which is above the left edge of the press face 48A of the ejector 48). It can be more effectively suppressed that the foreign objects 88 discharged through the insertion through hole 40 to outside the buckle body 38 pass the through hole 28 of the partitioning wall 26 and penetrate (enter) into the placement space 36 of the lower cover 12B.

The first protrusion 76, the second protrusion 78, the third protrusion 80, the boss 84 and the pair of ribs 86 provided at the right hand side face of the main body portion 74 of the slider member 72 project out to the right hand side, and guide (push and/or press) the foreign objects 88 discharged through the insertion through hole 40 to outside the buckle body 38 to the right hand side (to the discharge space 34 that is at the opposite side of the placement space 36 at the lower cover 12B). It is accordingly more effectively suppressed that the foreign objects 88 pass through the through hole 28 of the partitioning wall 26 and penetrate (enter) into the placement space 36 of the lower cover 12B.

Moreover, the boss 84 provided at the right hand side face of the body portion 74 of the slider member 72 is elongated along the front side-back side direction, and a gap dimension in the front side-back side direction between the back side end face of the through hole 28 of the partitioning wall 26 and the boss 84 is set small. Therefore, as illustrated in FIG. 1 and FIG. 2, when the slider member 72 is disposed in the insertion position, the gap dimension between the boss 84 and the lower side end face of the through hole 28 can be made small (as small as possible, for example set at less than 2.5 mm, less than 2 mm or less than 1.5 mm). Accordingly, it is more effectively suppressed that the foreign objects 88 discharged through the insertion through hole 40 to outside of the buckle body 38 pass through between the boss 84 and the lower side end face of the through hole 28. Consequently, it is more effectively suppressed that the foreign objects 88 penetrate (enter) into the placement space 36 of the lower cover 12B.

Moreover, at the right hand side face of the body portion 74 of the slider member 72 the ribs 86 span between the second protrusion 78 and the third protrusion 80 and between the second protrusion 78 and the boss 84. The foreign objects 88 discharged through the insertion through hole 40 to outside of the buckle body 38 are accordingly suppressed by the ribs 86 from being stopped (caught) between the second protrusion 78 and the third protrusion 80 and between the second protrusion 78 and the boss 84. Hence it is suppressed that the foreign objects 88 that are caught between the second protrusion 78 and the third protrusion 80 or between the second protrusion 78 and the boss 84 pass through the through hole 28 due to being applied sliding force of the slider member 72 (in particular the foreign objects 88 pass over the lower side end face of the through hole 28). The foreign objects 88 can thus be more effectively suppressed from penetrating (entering) into the placement space 36 of the lower cover 12B.

Due to the above, the foreign objects 88 that have entered through the tongue insertion opening 14 at the upper end of the cover 12 into the buckle body 38 inside the cover 12 are discharged, under their own weight, through the insertion through hole 40 of the buckle body 38 (or for example through the insertion hole 42) and into the discharge space 34 of the lower cover 12B, and discharged through the discharge holes 24 of the lower wall of the lower cover 12B to outside the cover 12. It is effectively suppressed that the action of the buckle device 10 (including the action of the buckle switch 64) is restricted by the foreign objects 88.

Note that in the present exemplary embodiment, the boss 84 provided at the slider member 72 interacts (communicates) with the ejector 48. However the boss 84 (interaction (communication) portion) may be provided to the ejector 48 and configured to interact (communicate) with the slider member 72.

In the present exemplary embodiment, the right hand side face of the body portion 74 of the slider member 72 is disposed at the right hand side with respect to the left portion of the through hole 28. However, the right hand side face of the body portion 74 of the slider member 72 may be disposed at the same left-right direction position as the left portion of the through hole 28.

What is claimed is:

1. A buckle device comprising:
   an insertion body that is installed in a vehicle, a tongue provided at a belt installed in the vehicle being inserted into an inside portion of the insertion body whereby the belt is applied on a vehicle occupant;
   a moving member that is provided inside the insertion body, the moving member being moved according to insertion of the tongue inside the insertion body;
   a detector that is provided inside the insertion body and that includes a communication member communicating with the moving member, the communication member being moved according to movement of the moving member, and the detector detecting insertion of the tongue inside the insertion body by movement of the communication member; and
   a partitioning section that is provided inside the insertion body to partition between a moving member side and a detector side of the insertion body and that includes a through hole for communication between the moving member and the communication member, the communication member closing a portion of the through hole which portion is opened by the movement of the moving member, wherein when the tongue is not inserted into the inside portion of the insertion body, the through hole of the partitioning section is closed by the moving member, and wherein when the tongue is inserted into the inside portion of the insertion body, the closed portion of the through hole opened by movement of the moving member is closed by the communication member due to the communication member being moved by movement of the moving member.

2. The buckle device of claim 1, wherein the communication member includes a guide portion that guides a foreign object that has entered into the insertion body to the moving member side with respect to the through hole.

3. The buckle device of claim 2, wherein the guide portion restricts the foreign object from being caught on the communication member.

4. The buckle device of claim 1, wherein the moving member is disposed at a movement direction side with respect to the communication member, and a communication portion that communicates with the moving member is disposed at a portion on the movement direction side of the communication member.

5. The buckle device of claim 2, wherein the moving member is disposed at a movement direction side with respect to the communication member, and a communication portion that communicates with the moving member is disposed at a portion on the movement direction side of the communication member.

6. The buckle device of claim 1, wherein, when the tongue has been inserted into the inside portion of the insertion body, the communication member is inserted in the through hole so as to close the portion of the through hole which portion is opened by the movement of the moving member.

7. The buckle device of claim 2, wherein, when the tongue has been inserted into the inside portion of the insertion body, the communication member is inserted in the through hole so as to close the portion of the through hole which portion is opened by the movement of the moving member.

8. The buckle device of claim 4, wherein, when the tongue has been inserted into the inside portion of the insertion body, the communication member is inserted in the through hole so as to close the portion of the through hole which portion is opened by the movement of the moving member.

9. The buckle device of claim 2, wherein the guide portion is configured by plural convex portions that protrude from a face at the moving member side of the communication member towards the moving member side.

10. The buckle device of claim 4, wherein the guide portion is configured by plural convex portions that protrude from a face at the moving member side of the communication member towards the moving member side.

11. The buckle device of claim 1, wherein the insertion body includes a bottom plate, and the partitioning section is provided at the bottom plate so as to protrude from the bottom plate in a direction from the bottom plate toward the tongue inserted into the inside portion of the insertion body.

12. The buckle device of claim 11, wherein the through hole is formed at the partitioning section, the detector is provided at the bottom plate, and the partitioning section and the bottom plate are a one-piece construction.

13. The buckle device of claim 12, wherein the through hole is a recess in the partitioning section.

* * * * *